No. 898,346. PATENTED SEPT. 8, 1908.
S. Z. DE FERRANTI.
APPARATUS FOR THE TREATMENT OF GASES.
APPLICATION FILED JUNE 10, 1907.
3 SHEETS—SHEET 1.
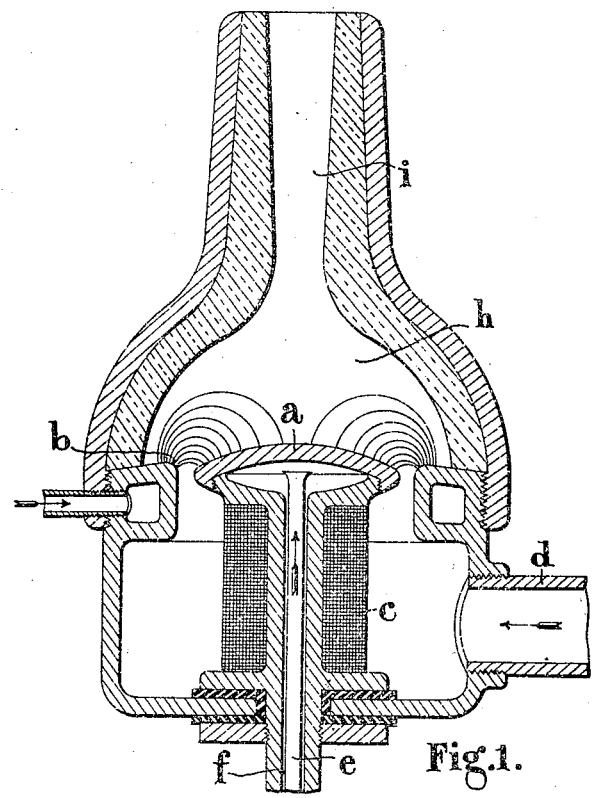
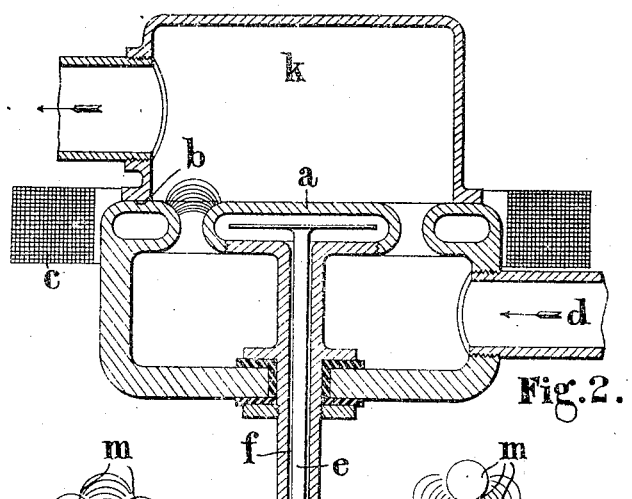

UNITED STATES PATENT OFFICE.

SEBASTIAN ZIANI DE FERRANTI, OF GRINDLEFORD, ENGLAND.

APPARATUS FOR THE TREATMENT OF GASES.

No. 898,346.     Specification of Letters Patent.     Patented Sept. 8, 1908.

Application filed June 10, 1907. Serial No. 378,290.

*To all whom it may concern:*

Be it known that I, SEBASTIAN ZIANI DE FERRANTI, engineer and electrician, subject of the King of Great Britain and Ireland, and residing at Grindleford, in the county of Derby, England, have invented certain new and useful Apparatus for the Treatment of Gases, of which the following is a specification.

This invention relates generally to means for the conducting of gaseous endothermic reactions, where, in order to effect the reaction, gases have to be heated to a high temperature and suddenly cooled.

The invention relates more particularly to the fixation of free nitrogen, whether contained in the air, or in waste furnace gases or the like. For example, it has been known for many years past that such nitrogen can be combined with the oxygen of the air in the electric arc, the resulting oxids of nitrogen forming nitrates or nitrites, depending upon the proportions of the various oxids of nitrogen which are produced. It has been shown also that in the production of such compounds in the electric arc, it is of extreme importance that the gases to be combined shall be raised to the high temperature for combustion and then rapidly cooled. On the rapidity of the cooling and withdrawal of the products of combustion from the arc, depends the yield obtained.

My invention consists in the improved apparatus to be hereinafter described.

Figure 3:
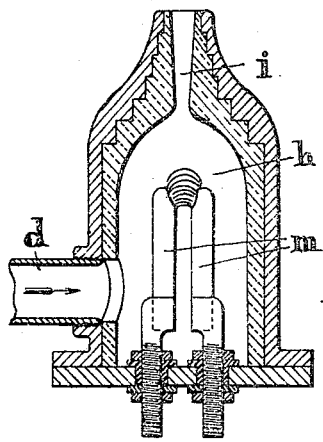
Figure 4:
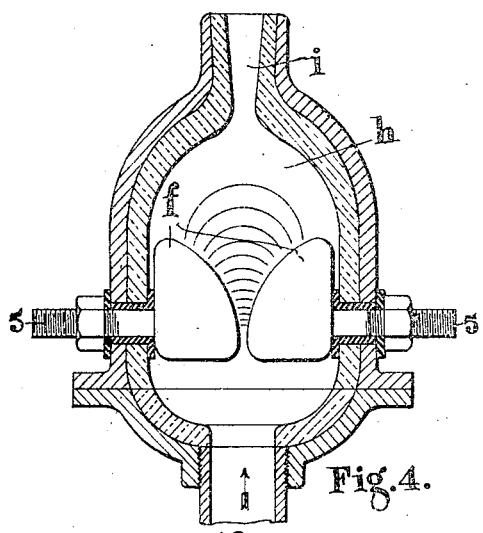
Figure 5:
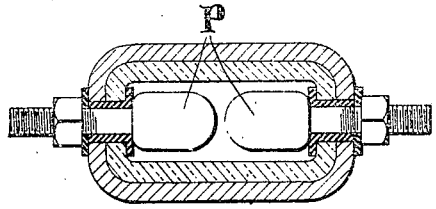
Figure 6:
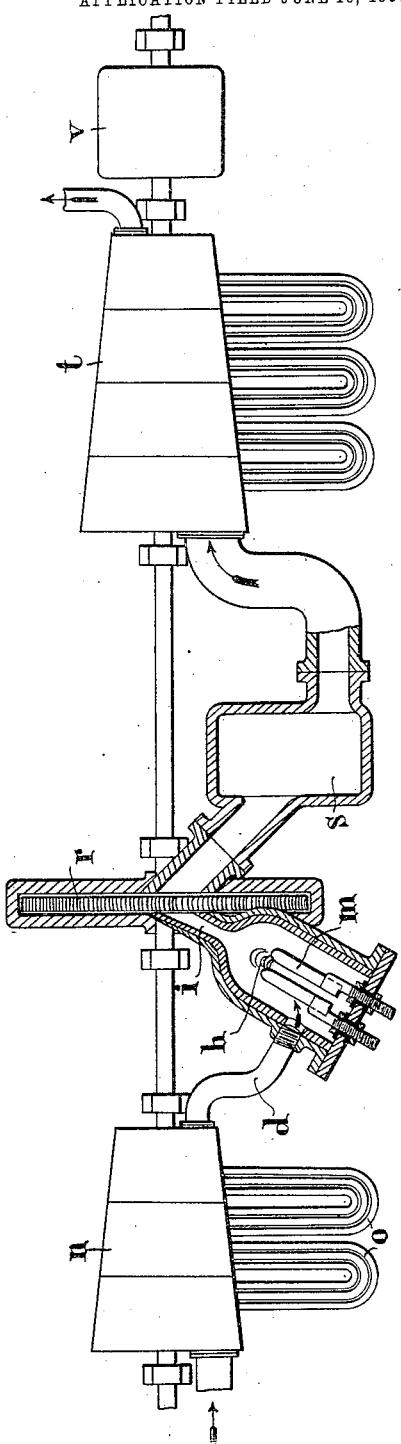

Referring to the accompanying drawings, which form part of the specification, Figure 1 shows a section through one form of arc chamber in which a continuous annular rotary arc is employed. Fig. 2 shows a modification of the above having a discontinuous rotary arc; Fig. 3 shows another form of arc chamber; Fig. 3$^a$ and 3$^b$, showing suitable arrangements of the carbons by way of example. Fig. 4 shows another modification of arc chamber; Fig. 5 being a section on the line 5—5 of Fig. 4, while, Fig. 6 shows a general arrangement of plant in which the elements of my invention are utilized to the best advantage.

I wish it to be understood that the drawings throughout are of a diagrammatic nature and should not be taken as working drawings.

Where desirable, the same reference symbols are used in the different figures to denote corresponding parts.

In carrying my invention into effect according to one form as shown in Fig. 1, I provide circular electrodes, $a$ and $b$, arranged concentrically one within the other, so as to leave an annular space across which the arc is struck. In order to rotate this arc, I arrange a suitable coil, $c$, preferably surrounding the inner electrode, $a$, so as to leave an uninterrupted passage for the air entering under pressure through the inlet, $d$, to pass to the arc. In order to provide for the cooling of the electrodes, I preferably make them of hollow form as shown and provide suitable means for circulating water or other cooling fluid through them. In the case of the inner electrode, $a$, the water may be introduced by the central pipe, $e$, and returned through the annular space, $f$, between this pipe, $e$, and the body of the electrode through which it passes. The arc chamber proper, $h$, is made of any suitable refractory material, the gases after the combination in the rotary arc, passing through this chamber to be cooled in any appropriate manner. In the figure, a diverging nozzle, $i$, is shown for this purpose. The cooling of such gases however heated by expansion in a nozzle, forms an important part of my invention and will be referred to more in detail hereinafter.

Referring now to Fig. 2, a generally similar arrangement of electrodes and so forth is shown to that above described, but in the present case the arc is discontinuous, that is to say, it extends over only a small portion of the annular air gap between the electrodes, though rotated as before by the coil, $c$. With this arrangement only a small amount of gas is raised to a high temperature in the arc, the main portion of the air supply passing through the annular space in which there is no arc, into the cooling chamber, $k$, where the combined gases from the arc meet it and are partially cooled, the final cooling being carried out in any well-known manner. The current supply to the arc may be either continuous or alternating, but where alternating current is employed, means must be provided to put the arc and field in phase, or again, the arc may be rotated first in one direction and then in the other by using a constant field co-acting with an alternating arc.

Referring now to Fig. 3, a modified form of arc chamber is shown, in which carbons, $m$, of ordinary form are provided as shown.

Figs. 3$^a$ and 3$^b$ show arrangements of the carbons, as seen in plan, suitable respectively for use with single phase and three phase current. Air enters under pressure through the pipe, d, as before, the nitrogen combined in the arc passing out by way of the divergent nozzle, i, where it is rapidly cooled.

Figs. 4 and 5 show a modification in which the electrodes, p, are formed and act in a known manner somewhat similar to a magnetic blow-out the arc striking across the narrow air gap at the lower part of the electrodes and by help of the current of air entering from below, spreading to the upper part.

Referring now more particularly to the cooling of the gases however heated by expansion in an appropriate nozzle, in order to get the best results, the air to be dealt with should be raised to a considerable pressure and then expanded into a good vacuum. It is also necessary that the nozzle should be correctly designed as regards its overall length and the ratio between the diameters of throat and discharge in accordance with the usual principles, so as to deal efficiently with the temperature and pressure drops concerned. When such precautions are taken, I have discovered and proved experimentally that complete cooling may be effected. I would also emphasize in particular, the fact that in order to secure the best results the pressure range should be as great as possible, preferably extending down to a considerable vacuum.

In order to prevent the kinetic energy of the moving gases issuing from the expansion nozzle, reappearing in the form of heat, I preferably extract the velocity in a suitable rotating wheel system, either by single or multiple abstraction of same, or rise of temperature due to impact may be prevented by mixing the high velocity out-flow with cooling fluid sprays or the like.

I will now describe with reference to Fig. 6 a complete form of plant in which the various elements of my invention are combined. The air to be dealt with passes into a multi-stage turbo-compressor, n, provided with intermediate coolers, o, and after compression enters by way of the pipe, d, into the arc chamber which may be of any of the forms described, that illustrated in Fig. 3 being shown by way of example. The gases formed and heated in the arc are then cooled by expansion in the nozzle, i, the velocity generated thereby being abstracted by a wheel system, single or multiple as required, indicated conventionally at r. The exhaust gases then pass preferably into a vacuum receiver, s, which is connected in turn to the multi-stage vacuum pump or compressor t, which is also provided with intermediate coolers, u. Finally a motor, v, is provided to supply a balance of power to the system. It is generally convenient to mount the compressor, n, wheel system, r, vacuum pump, t, and motor, v, on a common shaft as shown. It is important for combustion to be complete before expansion in the nozzle begins, so that the maximum cooling effect may be obtained.

Although I have above referred to the combustion or combination of oxygen or nitrogen, I would have it understood that my invention is applicable to the carrying on of any other similar endothermic reaction.

Having thus described my invention, what I claim as new and desire to secure by Letters Patent is:—

1. In apparatus for carrying out gaseous endothermic reactions the combination of means for heating the gases to the reaction temperature together with nozzle means for subsequently cooling said gases.

2. In apparatus for carrying out gaseous endothermic reactions, the combination of a shifting electric arc for heating the gases to the reaction temperature together with nozzle means for subsequently cooling said gases.

3. In apparatus for carrying out gaseous endothermic reactions the combination of means for heating the gases to the reaction temperature, nozzle means for cooling said gases together with means for utilizing the velocity of said gases after issuing from said nozzle means.

4. In apparatus for carrying out gaseous endothermic reactions the combination of means for heating the gases to the reaction temperature, nozzle means for cooling said gases together with a turbine for absorbing the velocity of said gases after issuing from said nozzle means.

5. In apparatus for carrying out gaseous endothermic reactions the combination of means for heating the gases to the reaction temperature, nozzle means for cooling said gases to a certain degree, together with means for further cooling said gases on issuing from said nozzle means.

In testimony whereof, I affix my signature in presence of two witnesses.

SEBASTIAN ZIANI DE FERRANTI.

Witnesses:
HERMANN HUBER,
JOSEPH SIMON.